UNITED STATES PATENT OFFICE.

EDWARD T. CLAIR, OF CHICAGO, ILLINOIS, ASSIGNOR TO SULZBERGER & SONS COMPANY, A CORPORATION OF NEW YORK.

METHOD OF THAWING FROZEN MEATS.

1,059,597. Specification of Letters Patent. Patented Apr. 22, 1913.

No Drawing. Application filed June 5, 1912. Serial No. 701,799.

*To all whom it may concern:*

Be it known that I, EDWARD T. CLAIR, a citizen of the United States, residing at Chicago, in the county of Cook and State of Illinois, have invented certain new and useful Improvements in Methods of Thawing Frozen Meats, of which the following is a specification.

My invention relates to the thawing of meat refrigerated for purposes of preservation so as to render it again suitable as an article of food.

It is well known that when meat which has been preserved by freezing is thawed in the open air in the usual manner preparatory to its use, several objectionable changes in the meat take place. One of these objections is leakage by which is meant the running or discharge of blood and other fluids or juices out of the meat. Another objection is shrinkage by which, as is naturally understood, is meant the loss in size and weight due to contraction of the meat substance. A third serious objection is that of discoloration, the meat turning quickly to a darker hue and, in some instances, almost black. Still another unfavorable condition of such thawed meat is that it becomes shiny and lifeless in appearance. These objections are serious not only to the dealer in refrigerated meat, but to the consumer equally as well, for the disadvantages to both result directly from conditions of inferiority over fresh meat which take place, not from the fact of refrigeration, but from the changes which take place in the meat during the thawing process.

The objections of shrinkage, discoloration, shininess, loss of lifelike texture, etc., result chiefly, if not entirely, from the loss of blood and other juices from the meat. This understanding is illustrated by a heavy section of beef which has been roasted, the outer portions being much discolored, dark, dry, grainy, coarse and lacking in freshness of appearance, while the central or "rare" portion being full of the meat juices is red and lifelike in appearance, solid of texture, and presents the usual characteristics of fresh meat as compared with the outer portion.

My invention has for its special objects the thawing of refrigerated meat in a manner which overcomes the objections hereinabove noted, and thus render such meat more valuable, more nutritive, and, generally speaking, a more acceptable article of commerce and consumption than it has been possible to produce by any method hitherto known. These objects are accomplished by placing the refrigerated meat in a substantially air-tight compartment and subjecting it to a thawing temperature under pressure. Such a compartment may be of the size of a room capable of holding many sides of beef, mutton or other slaughtered animal, or it may be a receptacle only large enough to accommodate meat in sizes for family use. Temperature may be supplied by means of steam or hot-air pipes within the room, or by placing the thawing receptacle adjacent to a heat supply such as a radiator or a kitchen stove, or it may be added simultaneously with the air pressure. I have found that a temperature of between 60 degrees and 70 degrees Fahrenheit is suitable for the purpose indicated. Pressure may be supplied to the defrosting chamber by means of an air pump of any approved size or construction. A pressure of from five to twenty pounds per square inch has been found suitable.

The function of the warmth supplied to the chamber is to thaw out the frosted meat, and the purpose of the pressure is to prevent exudation, discharge or flowing of the blood and other meat juices from the veins and capillaries, or from between the tissues of the meat substance. It will be readily appreciated that pressure at the open ends of the veins, capillaries and minute interstices between the various fibers and tissues will act as an air piston or stop to prevent the blood and juices therein from coming out, and the result is that all of the natural elements of fresh meat are preserved in the piece being treated, thus maintaining the texture, color, size and weight, as well as the original food value, of the meat.

Another important feature of this invention is that the meat may thus be defrosted in a cleanly and expeditious manner, and, if desired, the thawing chamber may contain a sterilizing substance inimical to any insects or micro-organisms which are known to attack meat substances, and render them less useful as articles of food.

The time required for thoroughly thawing frozen meat depends, of course, upon the size of the piece being treated, and, also, to some extent upon the native texture of the meat. For instance, beef being more solid than pork requires a longer time for defrosting, taken size for size. Similarly, if the temperature be increased, the time required in any instance will be less. It is evident that the duration of the defrosting process must be determined largely by the size and character of the meat being treated; but as such meat may readily be examined, this process may be used by anyone having ordinary skill and intelligence.

While I have described the preferred manner of carrying out the present improvements and discoveries in practice, it will be apparent to those skilled in the art that variations may be made therein as to both temperature and pressure without departing from the spirit or scope of the invention.

What I claim is:—

1. The method of thawing frozen meat which consists in applying pressure to the meat by a surrounding fluid medium while the meat is subjected to a thawing temperature.

2. The method of thawing frozen meat which consists in applying air pressure to the meat while the meat is kept at a thawing temperature.

3. The method of thawing frozen meat which consists in simultaneously applying a thawing temperature and pressure to the meat by a substantially quiescent surrounding fluid medium.

4. The method of thawing frozen meat which consists in subjecting the meat to a thawing temperature while the meat is confined in a fluid medium which is under more than atmospheric pressure.

5. The method of thawing frozen meat which consists in subjecting the meat to a temperature of from 60 degrees to 70 degrees Fahrenheit while the meat is confined in a fluid medium which is under more than atmospheric pressure.

6. The method of thawing frozen meat which consists in subjecting the meat to a thawing temperature while the meat is confined in a fluid medium which is under pressure of from five to twenty pounds per square inch above atmospheric pressure.

7. The method of thawing frozen meat which consists in subjecting the meat to a temperature of from 60 degrees to 70 degrees Fahrenheit while the meat is confined in a fluid medium which is under a pressure of from five to twenty pounds per square inch above the normal pressure of the atmosphere.

EDWARD T. CLAIR.

Witnesses:
WM. O. BELT,
LUTHER JOHNS.

Copies of this patent may be obtained for five cents each, by addressing the "Commissioner of Patents, Washington, D. C."